United States Patent Office 3,086,985
Patented Apr. 23, 1963

3,086,985
PREPARATION OF DIALLYLIC PHTHALATES
Hugo Stange, Princeton, and James Forrest Allen, Pennington, N.J., assignors to FMC Corporation, a corporation of Delaware
No Drawing. Filed Mar. 30, 1960, Ser. No. 18,514
4 Claims. (Cl. 260—475)

This invention relates to an improved method of preparing allylic esters of dibasic acids, and particularly to a novel process for the preparation of diallylic esters of phthalic acids.

Allylic esters of phthalic acids have heretofore been prepared by a number of standard esterification procedures. For example, the reaction of allylic halides with metal salts of phthalic acids has been described, in both aqueous and anhydrous systems, usually in the presence of a tertiary amine catalyst. This esterification is a two-step reaction, requiring first the preparation of the metal salt of the phthalic acid, and second, the reaction of the metal phthalate with the allylic halide. The requirement in this process for initial preparation of the phthalate salt from the phthalic acid, before the actual esterification, is accompanied by several disadvantages: in anhydrous systems, the process of preparing the anhydrous metal phthalate is time consuming, since the salt must be prepared in aqueous solution and subsequently dried, and requires special equipment due to corrosion problems; if the metal phthalate is prepared and used in aqueous medium, substantial decomposition of the allylic halide in the subsequent esterification may occur due to its instability in the presence of water; and there is the economic disadvantage of requiring an additional operation in the overall synthesis. Yet, heretofore, no procedure has been provided for the direct reaction, in one step, of a phthalic acid with an allylic halide.

Another process which has been used for the preparation of diallylic phthalates is the direct esterification of phthalic acid or anhydride with an allylic alcohol. This process is also accompanied by series disadvantages, in addition to the economic disadvantage of using the more expensive allylic alcohol rather than the corresponding halide. Excess alcohol is required to complete the reaction, and to compensate for alcohol lost through by-product ether formation and through polymerization of the alcohol at the prolonged processing times at elevated temperatures. Additional problems arise since allyl alcohols tend to isomerize irreversibly to the isomeric aldehydes under the acidic conditions of esterification.

Thus, the object of the present invention is to provide a process for the preparation of diallylic phthalates which is free of the disadvantages of the prior art processes.

A further object is to provide a one step process for the preparation of diallylic phthalates from phthalic anhydride.

A further object is to provide an efficient method for the preparation of diallylic phthalates without the intermediate preparation of the metal phthalate.

A further object is to provide a simpler and more economical process for the preparation of diallylic phthalates than was heretofore available.

These and other objects will become apparent from the following description of the invention.

It has now been discovered that a phthalic acid can indeed be esterified directly with an allylic halide, to produce a diallylic phthalate in one step, without either the intermediate preparation of the metal phthalate, as was heretofore necessary, or the use of allyl alcohol. This one-step synthesis is accomplished by reacting a phthalic acid, including phthalic anhydride, with equivalent amounts of sodium carbonate and an allylic halide, under substantially anhydrous conditions, employing a tertiary amine catalyst. When these reactants are combined, the diallyl phthalate is formed under unusually mild conditions, normally in the range of 75° to 150° C.—a particularly surprising result in view of the much higher temperatures required for the anhydrous reaction of phthalic acid with sodium carbonate, and suggesting that the mechanism of this reaction may actually be different from that of the two-step process of the prior art.

The process of this invention is illustrated in the following equation for the reaction of phthalic anhydride with allyl chloride:

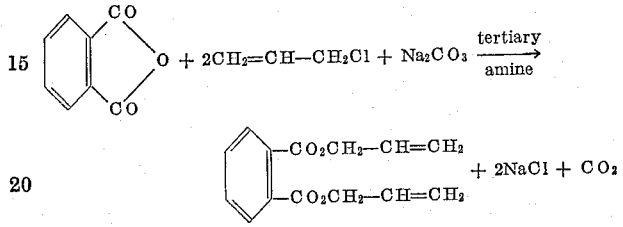

In the above formulae, the allylic halide may be the chloride, as shown, or other halides, such as the bromide and iodide. The chloride is generally preferred, for economy and availability. The allylic group may be allyl as shown, or substituted allyl, such as methallyl, crotyl, or 2-octenyl. The reaction requires two moles of allylic halide to react with each mole of the phthalic acid. A slight excess of allylic halide may be used, to provide a solvent for the product and to compensate for any losses during the reaction. Unreacted allylic halide may be recovered or recycled. If desired, an inert solvent or heel of the product may be present, to control the reaction temperature or facilitate contact among the reactants.

As the phthalic acid, phthalic anhydride is the preferred reagent to produce the diallylic orthophthalates. The isomeric dicarboxylic acids, including isophthalic and terephthalic acid, may also be employed. The reaction proceeds under anhydrous conditions, or in the presence of traces of water, which traces do not negate the substantially anhydrous nature of the reaction medium. Traces of water in the reaction have occasionally been observed to have an accelerating effect.

An equivalent amount of sodium carbonate is consumed in the reaction. This reactant, in anhydrous form, should be thoroughly mixed with the phthalic acid or anhydride, for optimum results in this heterogeneous reaction. If desired, excess sodium carbonate may be present.

The tertiary amine catalyst may be any tertiary amine that is at least partially soluble in the reaction medium. For economy, lower trialkyl amines are preferred, but many others are effective, and the particular amine used is not critical. When the reaction is conducted at atmospheric pressure, the tertiary amine should be sufficiently high boiling that it does not distill out of the reaction mixture. The tertiary amine is used in catalytic amounts. In practice, good results are obtained using about 5–10% of amine by weight of phthalic anhydride, although amounts outside of this range may be employed.

The process may be conducted at atmospheric pressure, usually under reflux conditions, or at superatmospheric pressure and elevated temperature. Reaction temperatures generally range from about 75° to 150° C., the reaction time decreasing as the temperature increases. At temperatures below about 75° C. the reaction is usually too slow to be practical. The upper temperature limit is controlled by convenience in operation and the stability to polymerization of the reactants and products.

When the reaction is complete the products are separated by standard procedures, including filtration of the inorganic salt produced, recovery of the catalyst and unreacted starting materials if desired, and separation of the ester by standard procedures such as extraction or distillation.

This invention is illustrated by the following examples:

*Example 1.—Preparation of Dimethallyl Phthalate*

Seventy-four grams of phthalic anhydride, 55.7 g. of anhydrous sodium carbonate, 117.7 g. of methallyl chloride, and 10.1 g. of triethylamine were placed in a 500 ml. flask equipped with a stirrer, condenser, and a thermometer dipping into the reaction mixture. The mixture was refluxed for 15 hours, the temperature rising from 93° to 100° C. over this period. The reaction mixture was cooled, filtered to remove sodium chloride, and then heated to 160° C. to remove unreacted methallyl chloride. Distillation of the residue produced 87.5 g. of dimethallyl phthalate, B.P. 133–149° C. (0.2 mm.). An additional 30 g. of product was obtained by washing the sodium chloride filter cake with benzene followed by drying and distillation. The total weight of dimethallyl phthalate was 117.5 g., 86% of the theoretical yield; $n^{35}D$ 1.5090.

*Example 2.—Preparation of Diallyl Phthalate*

An autoclave was charged with 592 g. of phthalic anhydride mixed with 530 g. of anhydrous sodium carbonate, 1230 g. of 97.8% allyl chloride, 38.6 g. of triethylamine, and 2.0 g. of hydroquinone antioxidant. The autoclave was sealed, and its contents agitated and heated for 5.25 hours, over a temperature range of 120–140° C. Carbon dioxide was removed from the reactor intermittently. The autoclave and its contents were cooled to 30° C., additional gas was voided, and two liters of ice-water was mixed thoroughly with the reaction mixture. The aqueous and organic phases were separated, and the latter was washed with water and steam-stripped to free it of excess allyl chloride. The residual organic layer was separated, washed with aqueous sodium carbonate until neutral and then with water, and dried by distillation at moderately reduced pressure to yield 899 g. (91% of the theoretical yield) of diallyl phthalate, B.P. 120–130° C. (0.5–1 mm.). The product assayed by saponification as 99.7% pure.

*Example 3.—Preparation of Diallyl Phthalate*

Seventy-four grams of phthalic anhydride, 157.5 g. of allyl bromide, 55.7 g. of anhydrous sodium carbonate and 10.1 g. of methyldiethylamine were placed in a flask and heated to gentle reflux during stirring. Reflux was continued for four hours. The mixture was then cooled, filtered, the filter cake washed well with ether, and the resulting ether solution of product washed with water. After drying the ether solution the solvent was removed in vacuo, leaving 77 g. (62.5% yield) of diallyl phthalate, B.P. 115–118° C. (0.05 mm.).

*Example 4.—Preparation of Diallyl Isophthalate*

To an autoclave was charged 664 g. of isophthalic acid, 430 g. of sodium carbonate, 918 g. of allyl chloride and 39 g. of triethylamine and 2.0 g. hydroquinone antioxidant. The autoclave was sealed, agitated, and heated at 122°–155° C. for 9.75 hours, with intermittent bleeding of carbon dioxide. The product was worked up as in Example 2, to yield 540 g. (55% of theoretical) of diallyl isophthalate, B.P. 158° C. at 0.9 mm. Hg, purity 100% by saponification analysis.

The diallylic phthalates prepared by the process of this invention are useful monomers for the preparation of synthetic resins, and may be polymerized and copolymerized to form thermoplastic polymers having residual unsaturation, and cross-linked thermosetting resins of superior electrical and mechanical properties.

From the foregoing description and illustrative examples it is apparent that the novel process of this invention is susceptible to numerous modifications and variations within the scope of the disclosure, and it is intended to include such modifications and variations in the following claims.

We claim:

1. The method of producing a diallylic phthalate in one step from phthalic anhydride and an allylic halide selected from the group consisting of allyl and lower alkyl substituted allyl chlorides, bromides and iodides which comprises reacting one mole of a phthalic acid with one mole of sodium carbonate and two moles of said allylic halide in a single reaction step, in the presence of 5–10%, by weight of phthalic anhydride, of a tertiary amine which is at least partially soluble in the reaction medium, under substantially anhydrous conditions at a temperature of 75–150° C., thereby directly producing said diallylic phthalate.

2. The method of claim 1, wherein the allylic halide is allyl chloride.

3. The method of claim 1, wherein the allylic halide is methallyl chloride.

4. The method of producing a diallylic phthalate in one step from phthalic anhydride and an allylic halide selected from the group consisting of allyl and lower alkyl substituted allyl chlorides, bromides and iodides, which comprises reacting one mole of phthalic acid with one mole of sodium carbonate and two moles of said allylic halide in a single reaction step, in the presence of a catalytic amount of a tri(lower alkyl)amine, under substantially anhydrous conditions at a temperature of 75–150° C., and separating the diallylic phthalate thus produced from the reaction mixture.

References Cited in the file of this patent

UNITED STATES PATENTS

| | | |
|---|---|---|
| 2,062,917 | Lawson | Dec. 1, 1936 |
| 2,617,820 | Gamrath et al. | Nov. 11, 1952 |
| 2,939,879 | Benedictis | June 7, 1960 |
| 2,992,239 | Nevin et al. | July 11, 1961 |

OTHER REFERENCES

Wagner et al.: Synthetic Organic Chemistry, p. 484, J. Wiley, 1953.